No. 894,724. PATENTED JULY 28, 1908.
C. CONTAL.
MOTOR CYCLE.
APPLICATION FILED MAR. 30, 1906.

Witnesses

Inventor
Camille Contal
H. B. Willson & Co.
Attorneys

UNITED STATES PATENT OFFICE.

CAMILLE CONTAL, OF LEVALLOIS-PERRET, FRANCE.

MOTOR-CYCLE.

No. 894,724.　　　　　Specification of Letters Patent.　　　　Patented July 28, 1908.

Application filed March 30, 1906. Serial No. 308,930.

*To all whom it may concern:*

Be it known that I, CAMILLE CONTAL, a citizen of the Republic of France, residing at Levallois-Perret, Seine, 1 Rue Gravel, in the Republic of France, engineer, have invented certain new and useful Improvements in Motor-Cycles, of which the following is a specification.

My invention relates to improvements in motor-cycles and it has for its object to so construct a motor-cycle that it shall have in front of the frame either a box for the carriage of goods or a seat for the conveyance of a traveler. In motor-cycles of this kind as constructed heretofore, the accessories of the motor are cumbersome on account of being located in divers places of the frame, and, more often than not, are thus exposed to jarrings, inclemency of the weather, and the like.

The present invention consists in securing behind the said box or seat a casing having independent compartments so arranged as to receive the greater number of the accessories, such as the water-tank, the oil-reservoir, the secondary batteries, the induction coil, tools for repairs, and the like. These several accessories are thus arranged near to the members with which they are in relation, so that the connections for the water, the lubricating matter, the oil, and the electric connections are shortened and kept well out of sight, that the secondary batteries, the induction coils, and other frail members are well protected against inclemency of the weather and jarrings, and that the frame or chassis of the motor-cycle is entirely free from encumbrance, all the parts of the same being of easy access.

Figure 1:
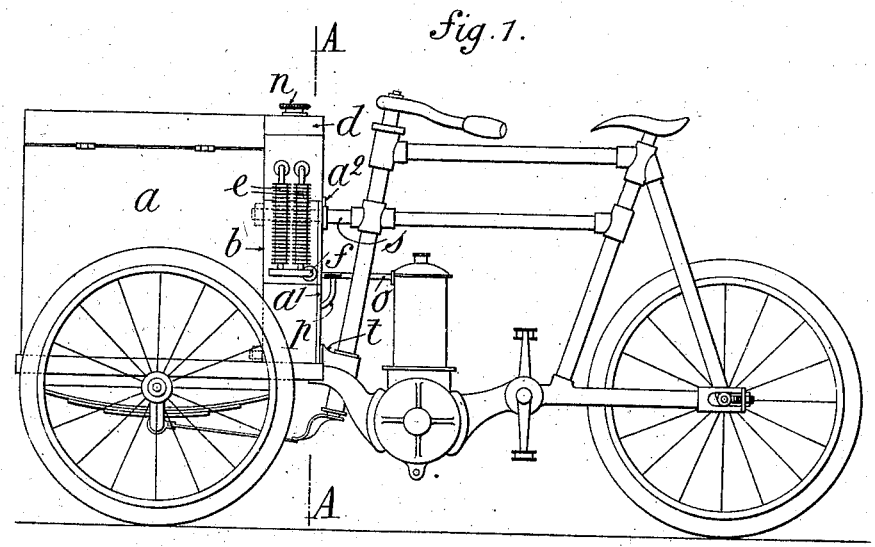
Figure 2:
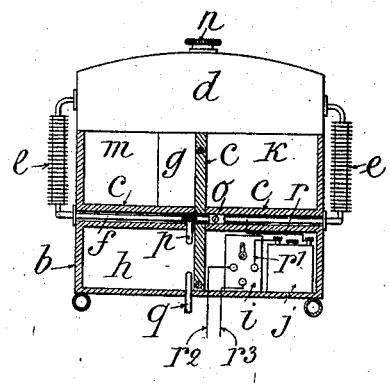

In the accompanying drawing, which shows one embodiment of my invention, Figure 1 is a side elevation of a three-wheel motor-cycle for the carriage of goods or the conveyance of passengers; and Fig. 2 is a vertical sectional view on the line A—A of Fig. 1.

Behind the box for goods $a$ is removably secured, by grooves and ribs or any other suitable means, a casing for accessories $b$, which is divided into compartments by partitions $c$, and above which is located a water-tank $d$. On the sides of the said water-tank $d$ are arranged radiator tubes $e$, connected together by a transversal tube $f$, which passes through the casing $b$. In the compartments of the latter are located a reservoir $g$ for the lubricating matter, an oil-reservoir $h$, an induction coil $i$, secondary batteries $j$, and a box $k$, to contain accessories for the repairs of tires, tools, and divers accessories (not shown) located at $m$. The rear wall $a^1$ of the box $a$ is divided into two parts, which are slidable sidewise in slide-ways $a^2$, located at top and bottom.

$n$ designates the stopper of the hole for filling the water-tank, $o$ the outlet pipe for the water to the motor, $p$ the pipe for filling the oil-reservoir, $q$ the outlet pipe for the oil to the carbureter of the motor, $r$ a wire connecting one pole of the secondary batteries with the tube $f$, $r^1$ a wire connecting the other pole of the secondary batteries with the primary coil, $r^2$ a wire connecting the primary coil to the switch, and $r^3$ a wire connecting the secondary coil with the igniting device of the motor.

The casing $b$ may be connected to the frame or chassis of the motor-cycle by means of the pieces $s$, $t$, to which it is secured by screws or bolts.

It will be understood that the arrangement of the compartments and of the divers accessories in the casing $b$, as well as of the radiator tubes may be varied without departing from the spirit of this invention. For instance, the said radiator tubes may be located under instead of at the sides of the said casing.

Claims:

1. In combination with a motor cycle having at the front thereof a support for a load to be carried, of a box provided with compartments and mounted immediately behind said support and adapted to inclose the accessories of the motor cycle.

2. In a motor-cycle having in front a support for the load to be conveyed, the combination of a casing for accessories secured behind the said support, of a water-tank on the said casing, of external radiator tubes located on the outside of the casing for accessories, and a pipe arranged transversally within the said casing and which is adapted to be connected with the water-jacket of the motor.

3. In a motor-cycle having in front a support for the load to be conveyed, the combination of a casing for accessories secured behind the said support, the rear wall of the said casing being divided into two parts which are slidable laterally in slide-ways located at top and bottom.

In testimony, that I claim the foregoing as my invention, I have signed my name in presence of two subscribing witnesses.

CAMILLE CONTAL.

Witnesses:
    HANSON C. COXE,
    MAURICE ROUX.